(12) United States Patent
Kim

(10) Patent No.: US 9,006,670 B2
(45) Date of Patent: Apr. 14, 2015

(54) X-RAY DETECTOR

(75) Inventor: Young Ik Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 323 days.

(21) Appl. No.: 13/529,001

(22) Filed: Jun. 21, 2012

(65) Prior Publication Data

US 2013/0248725 A1    Sep. 26, 2013

(30) Foreign Application Priority Data

Mar. 21, 2012  (KR) .................. 10-2012-0028973

(51) Int. Cl.
*G01T 1/20* (2006.01)

(52) U.S. Cl.
CPC ........................ *G01T 1/20* (2013.01)

(58) Field of Classification Search
CPC .................................. G01T 1/20; G01T 1/16
USPC ............................................... 250/369, 336
See application file for complete search history.

(56) References Cited

U.S. PATENT DOCUMENTS 7,311,440 B2 * 12/2007 Yoon et al. .................... 378/207
2009/0184250 A1 * 7/2009 Igarashi .................... 250/361 R

FOREIGN PATENT DOCUMENTS

| KR | 10-2009-0076060 A | 7/2009 |
| KR | 10-2010-0082631 A | 7/2010 |
| KR | 10-2010-0109381 A | 10/2010 |
| KR | 10-2011-0094182 A | 8/2011 |

* cited by examiner

*Primary Examiner* — David Porta
*Assistant Examiner* — Faye Boosalis
(74) *Attorney, Agent, or Firm* — Lee & Morse, P.C.

(57) ABSTRACT

An X-ray detector includes a top receiving container in which one or more subjects are disposed, an X-ray detection unit that detects shadow images of the one or more subjects when X-rays are radiated to the one or more subjects and calculates an X-ray radiation angle of the radiated X-rays based on the shadow images of the one or more subjects, and a bottom receiving container having a receiving space in which the X-ray detection unit is received.

24 Claims, 11 Drawing Sheets

$\tan\theta = b/a$

X-RAY DETECTOR

CROSS-REFERENCE TO RELATED APPLICATION

This application claims priority from Korean Patent Application No. 10-2012-0028973 filed on Mar. 21, 2012 in the Korean Intellectual Property Office, the disclosure of which is incorporated herein by reference in its entirety.

BACKGROUND

1. Field

Embodiments relate to an X-ray detector, and more particularly, to an X-ray detector which can measure an X-ray radiation angle.

2. Description of the Related Art

An X-ray detector is an apparatus which detects an amount of X-rays radiated to an object and transmitted through the object based on a difference in the energy intensity distribution of transmitted X-rays, thereby identifying the internal structure or state of the object.

SUMMARY

According to an embodiment, there is provided an X-ray detector including a top receiving container in which one or more subjects are disposed, an X-ray detection unit that detects shadow images of the one or more subjects when X-rays are radiated to the one or more subjects, and calculates an X-ray radiation angle of the radiated X-rays based on the shadow images of the one or more subjects, and a bottom receiving container having a receiving space in which the X-ray detection unit is received.

The top receiving container may include a first cover, the first cover having a first region and a second region, and the second region surrounding the first region.

A surface of the first region of the first cover may include one or more grooves, and the one or more subjects are disposed in the grooves. The one or more subjects may be disposed in the first region.

The one or more subjects may be disposed adjacent to a boundary between the first region and the second region.

The top receiving container may further include a second cover positioned on the first cover. The one or more subjects may be disposed in the second cover.

The X-ray detection unit may include a scintillator that converts incident X-rays into light, a sensor panel that senses an intensity of the light from the scintillator, a memory that stores shadow information of the one or more subjects based on a predetermined X-ray radiation angle, and an operation unit that calculates the X-ray radiation angle of the radiated X-rays based on the shadow images of the one or more subjects formed on the sensor panel and the shadow information stored in the memory.

The operation unit may detect the shadow information corresponding to the shadow images of the one or more subjects formed on the sensor panel from the memory and may calculate the X-ray radiation angle of the radiated X-rays based on the detected shadow information.

The memory may store the shadow information of the one or more subjects when the predetermined X-ray radiation angle is 90 degrees. The operation unit may calculate the X-ray radiation angle of the radiated X-rays based on the shadow information of the one or more subjects when the predetermined X-ray radiation angle is 90 degrees, and based on the shadow images of the one or more subjects formed on the sensor panel.

The memory may store vertical distances between the one or more subjects and the sensor panel. The operation unit may calculate the X-ray radiation angle of the radiated X-rays based on the vertical distances, the shadow information of the one or more subjects when the predetermined X-ray radiation angle is 90 degrees, and the shadow images of the one or more subjects formed on the sensor panel.

The operation unit may calculate the X-ray radiation angle of the radiated X-rays using a trigonometric function in which the vertical distances and a position difference between the shadow information of the one or more subjects when the predetermined X-ray radiation angle is 90 degrees and the shadow images of the one or more subjects formed on the sensor panel are used as sides of a triangle.

The shadow information may include subject shadow images depending on the predetermined X-ray radiation angle.

The one or more subjects are made of lead or tungsten.

According to an embodiment, there is provided an X-ray detector including a bottom receiving container having a bottom plate and a sidewall defining a receiving space, an X-ray detection unit that is accommodated in the receiving space, the X-ray detecting unit detecting a shadow image of the sidewall when X-rays are radiated to the X-ray detector and calculating an X-ray radiation angle of the radiated X-rays based on the shadow image of the sidewall, and a top receiving container disposed on the sidewall.

The X-ray detection unit may include a scintillator that converts incident X-rays into light, a sensor panel that senses the intensity of the light from the scintillator, a memory that stores shadow information of the sidewall based on a predetermined X-ray radiation angle, and an operation unit that calculates the X-ray radiation angle of the radiated X-rays based on the shadow image of the sidewall formed on the sensor panel and the shadow information stored in the memory.

The memory may store a height of the sidewall from the sensor panel. The operation unit may calculate the X-ray radiation angle of the radiated X-rays based on the height of the sidewall and the shadow image of the sidewall formed on the sensor panel.

The operation unit may calculate the X-ray radiation angle of the radiated X-rays using a trigonometric function in which the height of the sidewall and a length of the shadow of the sidewall are used as sides of a triangle.

The bottom receiving container may include a protrusion protruding from the sidewall.

The sidewall may be "C" shaped.

The shadow information may include a shadow image of the sidewall depending on the predetermined X-ray radiation angle.

According to an embodiment, there is provided an X-ray detector including a bottom receiving container having a bottom plate and a sidewall defining a receiving space, a top receiving container disposed on the sidewall and having a first region and a second region, an X-ray detection unit that is accommodated in the receiving space, the X-ray detection unit detecting a shadow image of the second region when X-rays are radiated to the X-ray detector, and calculating an X-ray radiation angle of the radiated X-rays based on the shadow image of the second region.

The second region may surround the first region. The second region may be made of lead or tungsten.

The X-ray detection unit may include a scintillator that converts incident X-rays into light, a sensor panel that senses an intensity of the light from the scintillator, a memory that stores shadow information of the second region based on a predetermined X-ray radiation angle, and an operation unit that calculates the X-ray radiation angle of the radiated X-rays based on the shadow image of the second region formed on the sensor panel and based on the shadow information stored in the memory.

The memory may store a height of the sidewall from the sensor panel to the sidewall. The operation unit may calculate the X-ray radiation angle of the radiated X-rays based on the height of the sidewall and the shadow image of the second region formed on the sensor panel.

BRIEF DESCRIPTION OF THE DRAWINGS

The above and other features will become more apparent by describing in detail embodiments thereof with reference to the attached drawings in which.

DETAILED DESCRIPTION

Figure 1:
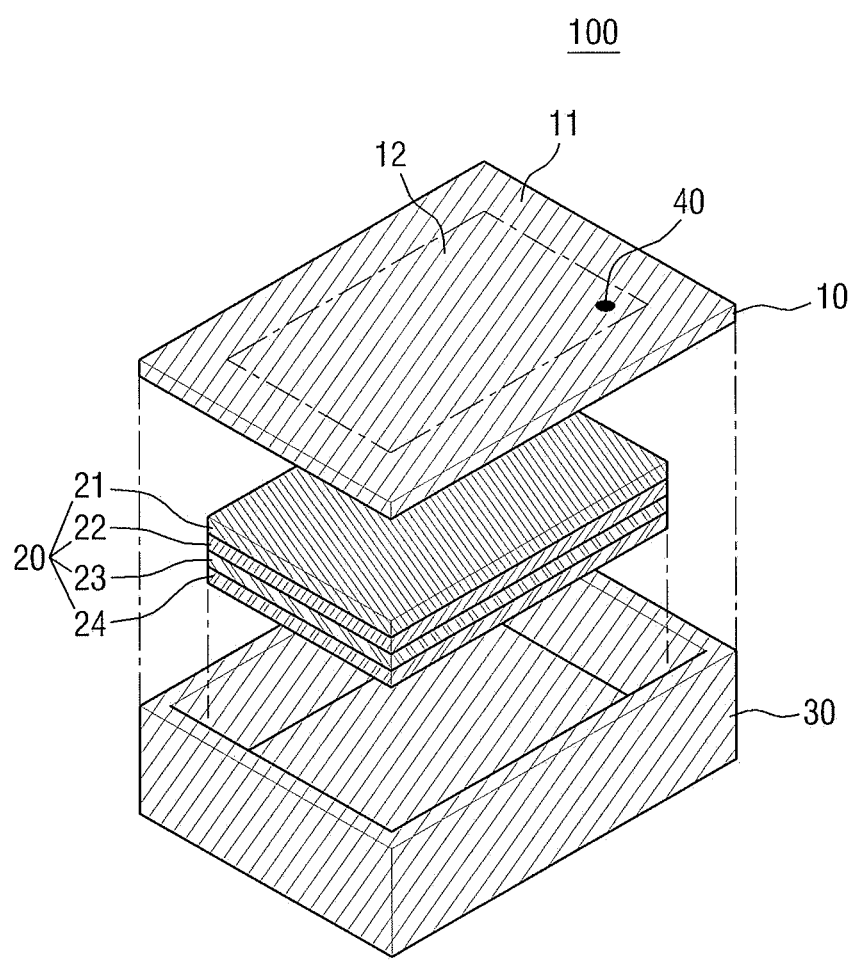
FIG. 1 is an exploded perspective view of an X-ray detector according to an embodiment.

Advantages and features and methods of accomplishing the same may be understood more readily by reference to the following detailed description of embodiments and the accompanying drawings. The embodiments may, however, be embodied in many different forms and should not be construed as being limited to the embodiments set forth herein. Rather, these embodiments are provided so that this disclosure will be thorough and complete and will fully convey the concept thereof to those skilled in the art, and the present invention will only be defined by the appended claims. Thus, in some embodiments, well-known structures and devices are not shown in order not to obscure the description with unnecessary detail. Like numbers refer to like elements throughout. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views. Accordingly, the exemplary views may be modified depending on manufacturing technologies and/or tolerances. Therefore, the embodiments are not limited to those shown in the views, but include modifications in configuration formed on the basis of manufacturing processes. Therefore, regions exemplified in figures have schematic properties and shapes of regions shown in figures exemplify specific shapes of regions of elements and do not limit aspects thereof.

Hereinafter, embodiments will be described in further detail with reference to the accompanying drawings.

FIG. 1 is an exploded perspective view of an X-ray detector according to an embodiment.

Referring to FIG. 1, the X-ray detector 100 according to an embodiment includes a first cover 10 of a top receiving container, an X-ray detection unit 20, a bottom receiving container 30 and a subject 40.

The top receiving container may include the first cover 10 and a second cover 15 positioned on the first cover 10. The first cover 10 of the top receiving container may be disposed on the bottom receiving container 30 and the X-ray detection unit 20, thereby protecting the X-ray detection unit 20 accommodated in the bottom receiving container 30. The top receiving container may be formed of a carbon panel. For brevity, while FIG. 1 illustrates that the top receiving container includes only the first cover 10, the top receiving container may also include the second cover 15, which will be described below with reference to FIG. 5.

The first cover 10 may have a first region 12 and a second region 11. In some embodiments, the second region 11 may surround the first region 12. The first region 12 may be positioned at a central portion of the first cover 10, and the second region 11 may be positioned at a peripheral portion of the first cover 10. The first region 12 may be a region into which X-rays are actually incident and from which an image of a photographed object is detected. The second region 11 may be a bezel region from which an actual image is not detected.

The first region 12 and the second region 11 may be made of the same material. In other implementations, the second region 11 may be a bezel region from which an actual image is not detected. Accordingly, a separate color printed layer may be provided.

When X-rays are radiated, the X-ray detection unit 20 may detect a shadow image of the subject 40 and calculate an X-ray radiation angle based on the shadow image of the subject 40. The X-ray detection unit 20 may include a scintillator 21, a sensor panel 22, an insulating substrate 23 and a circuit board 24. The circuit board 24 may include a memory and an operation unit.

The insulating substrate 23 may be configured to support the scintillator 21, the sensor panel 22, and the circuit board 24 of the X-ray detection unit 20. The sensor panel 22 may be disposed on one surface of the insulating substrate 23, and the scintillator 21 may be disposed on the sensor panel 22. The circuit board 24 including the memory and the operation unit may be disposed on the other surface of the insulating substrate 23.

The scintillator 21 may include a phosphor. Specifically, the scintillator 21 may include a phosphor having a columnar crystal structure, which may be generated by forming a layer by depositing cesium iodide (CsI) as a scintillating phosphor. The scintillator 21 may convert incident X-rays into light. Specifically, the scintillator 21 may convert incident X-rays into visible light.

The sensor panel 22 may sense the intensity of the light from the scintillator 21 in units of pixels of the sensor panel 22. A photoelectric converter such as a thin film transistor or a photodiode may be formed on each of the pixels of the sensor panel 22. Electric circuits for transmitting outputs of the photoelectric converter to an external device may be arranged on the sensor panel 22.

The circuit board 24 may include circuits for performing operations for obtaining an image of an object represented by radiated X-rays based on the signals read from the sensor panel 22.

The circuit board 24 may include a memory and an operation unit. The memory may store shadow information of the subject 40 depending on a predetermined X-ray radiation angle. The operation unit may calculate the X-ray radiation angle of radiated X-rays based on a shadow image of the subject 40 formed on the sensor panel 22 and the shadow information of the subject 40 stored in the memory. A method of calculating the X-ray radiation angle using the memory and the operation unit will be described in detail below. While FIG. 1 shows that the memory and the operation unit are included in the circuit board 24 of the X-ray detection unit 20, the memory and the operation unit may be positioned outside the X-ray detector 100.

The bottom receiving container 30 may have a receiving space, and the X-ray detection unit 20 may be accommodated in the receiving space. The bottom receiving container 30 may be configured to protect the X-ray detection unit 20 against external shocks and may be made of the same materials as the top receiving container.

One or more subjects 40 may be disposed in the top receiving container. The one or more subjects 40 may be made of a material through which X-rays are not transmitted well. The X-ray detector 100 according to the embodiment may incorporate the subjects 40 and calculate an X-ray radiation angle using shadows of the subjects 40. Thus, the subjects 40 may be made of a material through which X-rays are not transmitted well, so as to form shadows with respect to the X-rays. In some embodiments, the subjects 40 may be made of lead or tungsten.

The one or more subjects 40 may be shaped as circles. While FIG. 1 shows that the subjects 40 are circular, in other implementations, the subjects 40 may be polygonal or oval.

The one or more subjects 40 may be disposed in the top receiving container. A positional relationship between the subjects 40 and the top receiving container will now be described in more detail with reference to FIGS. 2 to 5.

Figure 2:
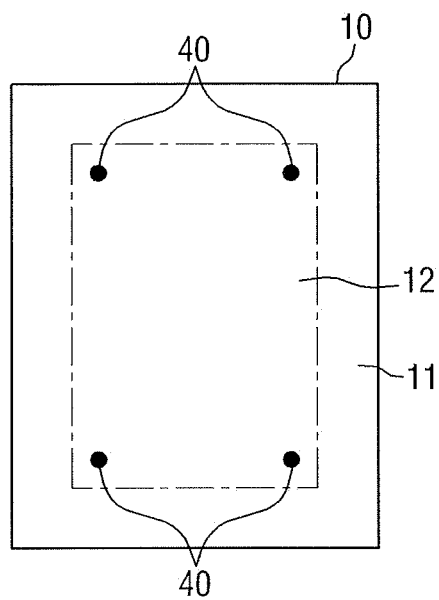
FIG. 2 is a top view of a first cover of a top receiving container according to an embodiment.
Figure 3:
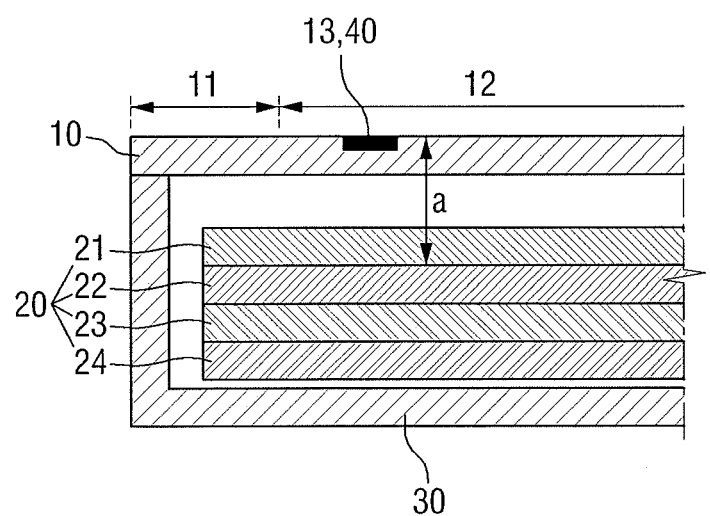
FIGS. 3 to 5 are cross-sectional views of X-ray detectors according to various embodiments.
Figure 4:
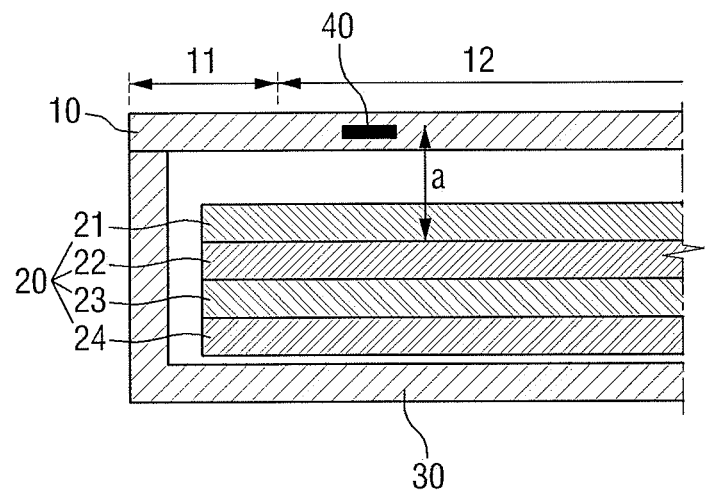
Figure 5:
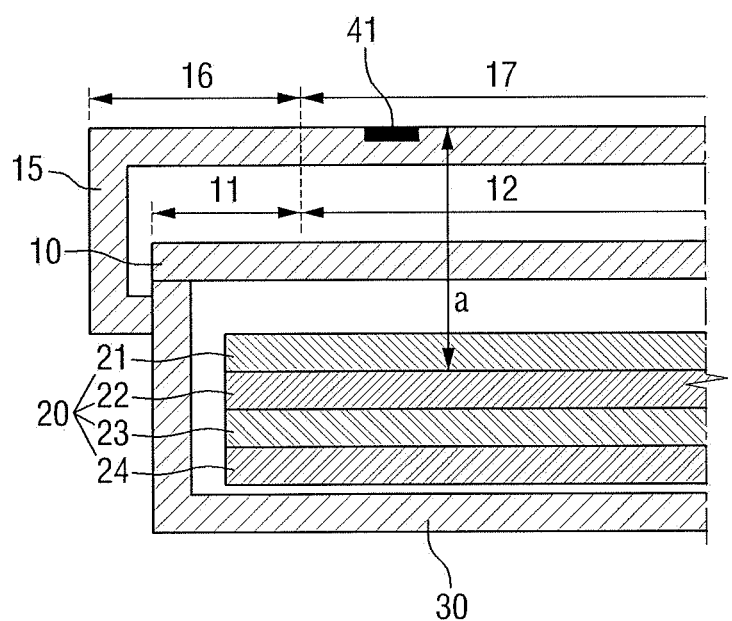

FIG. 2 is a top view of a first cover 10 of a top receiving container according to an embodiment and FIGS. 3 to 5 are cross-sectional views of X-ray detectors 100 according to various embodiments.

Referring to FIG. 2, the one or more subjects 40 may be disposed in the top receiving container, for example, in the first cover 10 of the top receiving container.

The one or more subjects 40 may be disposed in the first region 12 of the first cover 10. The X-ray detector 100 may calculate the X-ray radiation angle using shadows of the subjects 40. Accordingly, to obtain images for the shadows of the subjects 40, the first region 12 may be a region from which an image of a photographed object is detected. Thus, if the subjects 40 are disposed in the first region 12, the shadows of the images of the subjects 40 can be detected.

The one or more subjects 40 may be disposed adjacent to a boundary between the first region 12 and the second region 11. As described above, the first region 12 may be a region from which the photographed object image is detected. Accordingly, a photographed object, for example, a human body, may be positioned at a central portion of the first region 12. The subjects 40 may be positioned at a peripheral portion of the first region 12. In addition, the subjects 40 may be disposed adjacent to the boundary between the first region 12 and the second region 11 surrounding to the first region 12. Accordingly, photographing of the photographed object may not be affected by the subjects 40.

Multiple ones of the subjects 40 may be disposed in the first region 12. For brevity, while FIG. 1 illustrates that one subject 40 is disposed in the first region 12, multiple subjects 40 may be disposed in the first region 12, as shown in FIG. 2.

The subject 40 is disposed in the first region 12 where photographing is carried out. Accordingly, there is a possibility that the subject 40 could be covered by an object to be photographed. In such a case, a shadow image of the subject 40 would not be obtained. Therefore, when the multiple subjects 40 are disposed in the first region 12, a possibility is increased that some of the subjects 40 will not be covered by the object to be photographed. Thereby, an impossibility of obtaining any shadow images of the subject 40 may be avoided.

Referring to FIG. 3, one or more grooves 13 may be formed on one surface of the first region 12 of the first cover 10. Each of the multiple subjects 40 may be disposed in a respective one of the one or more grooves 13. In this case, a vertical distance 'a' between the subject 40 and the sensor panel 22 may be equal to a distance between the top surface of the sensor panel 22 and the top surface of the subject 40.

Referring to FIG. 4, the subject 40 may be disposed within the first region 12 of the first cover 10. The subject 40 may be disposed within the first region 12 of the first cover 10 at the time of forming the first cover 10. In this case, a vertical distance 'a' between the subject 40 and the sensor panel 22 may be equal to a distance between the top surface of the sensor panel 22 and the top surface of the subject 40.

Referring to FIG. 5, the top receiving container may further include a second cover 15 positioned on the first cover 10. The second cover 15 positioned on the first cover 10 may protect the first cover 10. When an object of the X-ray detector 100 is heavy, components capable of supporting the weight of the object may be desirable. In addition, components for protecting the X-ray detector 100 against external shocks may also be desirable. In this regard, in the X-ray detector 100 according to the present embodiment, the second cover 15 positioned on the first cover 10 may further be provided. While FIG. 5 shows that the second cover 15 is connected and fixed to the bottom receiving container 30, the second cover 15 may also be connected and fixed to the first cover 10. In addition, the second cover 15 may be fixed by various connection methods, including hook connection, screw connection, and so on.

The second cover 15 may include a first region 17 and a second region 16. In some embodiments, the second region 16 of the second cover 15 may surround the first region 17 of the second cover 15. The first region 17 of the second cover 15 may be positioned at a central portion of the second cover 15, and the second region 16 of the second cover 15 may be positioned at a peripheral portion of the second cover 15. The first region 17 of the second cover 15 may be located corresponding to the first region 12 of the first cover 10.

The subject 41 may be disposed in the first region 17 of the second cover 15. The X-ray detector 100 calculates an X-ray radiation angle based on the shadow of the subject 40. The first region 17 of the second cover 15 is a portion from which the image for the shadow of the subject 40 is detected. Thus, if the subject 40 is disposed in the first region 17 of the second cover 15 corresponding to the first region 12 of the first cover 10, the image for shadow of the subject 41 may also be detected. In this case, a vertical distance 'a' between the subject 41 and the sensor panel 22 may be equal to a distance between the top surface of the sensor panel 22 and the top surface of the subject 41.

Referring to FIGS. 3 to 5, portions between the first cover 10 of the top receiving container and the X-ray detection unit 20 and between the bottom receiving container 30 and the X-ray detection unit 20 may be empty spaces. However, in other implementations, the empty spaces may be filled with sponge material.

Figure 6:
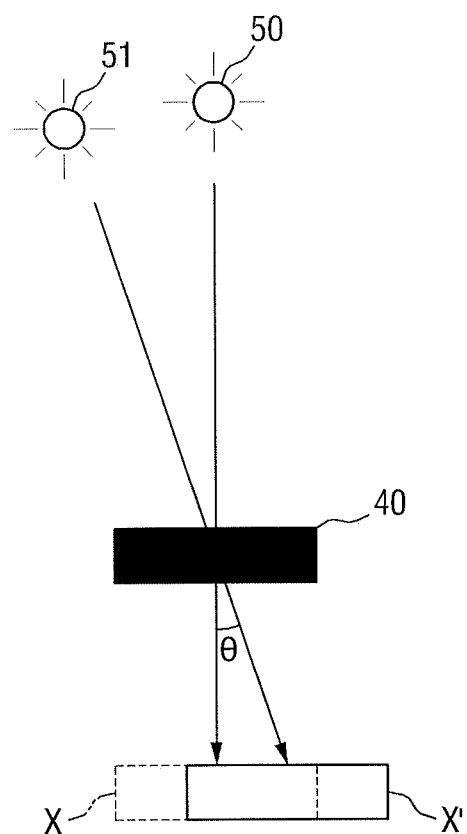
FIGS. 6 and 7 are conceptual diagrams for explaining a method of calculating an X-ray radiation angle in the X-ray detector shown in FIG. 1.
Figure 7:
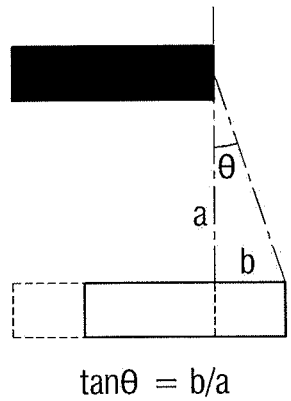

FIGS. 6 and 7 are conceptual diagrams for explaining a method of calculating an X-ray radiation angle in the X-ray detector shown in FIG. 1. The method of calculating an X-ray radiation angle in the X-ray detector will be described with reference to FIGS. 6 and 7.

As described above, the circuit board 24 includes a memory and an operation unit. The memory may store shadow information of the subject 40 based on a predetermined X-ray radiation angle. The operation unit may calculate the X-ray radiation angle of radiated X-rays based on a shadow image of the subject 40 formed on the sensor panel 22 and the shadow information of the subject 40 stored in the memory. The shadow information stored in the memory may include a shadow image of the subject 40 based on the predetermined X-ray radiation angle.

In some embodiments, the operation unit may detect the shadow information corresponding to the shadow image of the subject 40 formed on the sensor panel 22 from the memory and may determine the X-ray radiation angle based on the shadow information.

Referring to FIG. 6, when the X-ray radiation angle is 90 degrees, that is, when X-rays are radiated from an X-ray source 50, the shadow image of the subject 40 formed on the sensor panel 22 is an image labeled X. In addition, when the X-ray radiation angle is θ, that is, when X-rays are radiated from an X-ray source 51, the shadow image of the subject 40 formed on the sensor panel 22 is an image labeled X'. Distances between the X-ray sources 50 and 51 and the subject 40 may be sufficiently large compared to a size of the subject 40, such that it may be assumed that X-rays radiated into the subject 40 from the X-ray sources 50 and 51 are incident into the subject 40 in parallel.

The memory may pre-store the shadow image of the subject 40 depending on the predetermined X-ray radiation angle. Therefore, the operation unit may detect the shadow information corresponding to the shadow image of the subject 40 formed on the sensor panel 22 and may determine the X-ray radiation angle based on the detected shadow information. When the shadow image of the subject 40 formed on the sensor panel 22 is X', the operation unit may search the shadow information corresponding to the shadow image X' from the memory, and when the corresponding shadow information stored in the memory indicates a radiation angle of θ, the operation unit may determine the X-ray radiation angle of the radiated X-rays to be θ.

In some embodiments, the memory may store the shadow information of the subject 40 when the predetermined X-ray radiation angle is 90 degrees and may store a vertical distance between the subject 40 and the sensor panel 22. The operation unit may calculate the X-ray radiation angle of the radiated X-rays based on the shadow information of the subject 40 when the predetermined X-ray radiation angle is 90 degrees and based on the shadow image of the subject 40 formed on the sensor panel 22.

Referring to FIG. 7, the memory may store the shadow information X of the subject 40 when the predetermined X-ray radiation angle is 90 degrees and a vertical distance 'a' between the subject 40 and the sensor panel 22. The operation unit may calculate a position difference 'b' between the shadow information X of the subject 40 when the predetermined X-ray radiation angle is 90 degrees and the shadow image X' of the subject 40 formed on the sensor panel 22. The operation unit may calculate the X-ray radiation angle based on the vertical distance 'a' between the subject 40 and the sensor panel 22 and the position difference 'b' between the shadow information X of the subject 40 when the predetermined X-ray radiation angle is 90 degrees and the shadow image X' of the subject 40 formed on the sensor panel 22. For example, the operation unit may employ a trigonometric function.

Referring to FIG. 7, the operation unit may calculate the X-ray radiation angle θ using a trigonometric function wherein the vertical distance 'a' represents one side of a triangle, a position difference 'b' between the shadow information X of the subject 40 when the predetermined X-ray radiation angle is 90 degrees and the shadow image X' of the subject 140 formed on the sensor panel 22 represents another side of the triangle, and the one side and the another side of the triangle are at a right angle. Specifically, the operation unit may calculate the X-ray radiation angle θ using a formula $\tan\theta = b/a$.

The X-ray radiation angle of the radiated X-rays may be calculated by the above-described method. In another implementation, in order to measure an angle more accurately, the calculation method shown in FIGS. 8 and 9 may be used.

Figure 8:
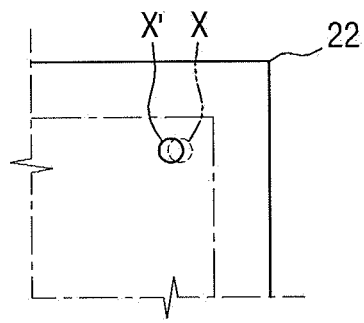
FIGS. 8 and 9 are top views of a sensor panel for explaining a process of calculating an X-ray radiation angle in the X-ray detector shown in FIG. 1.
Figure 9:
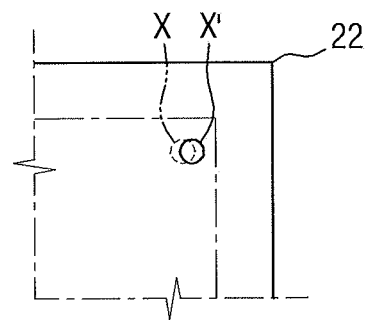

FIGS. 8 and 9 are top views of a sensor panel for explaining a method of calculating an X-ray radiation angle in the X-ray detector shown in FIG. 1.

Referring to FIGS. 8 and 9, the shadow image X is a shadow image when the predetermined X-ray radiation angle is 90 degrees and the shadow image X' is a shadow image when X-rays are tilted with a radiation angle θ.

Referring to FIG. 8, the shadow image X' formed when tilted X-rays are radiated is shown in the left of the shadow image X formed when the predetermined X-ray radiation angle is 90 degrees. Referring to FIG. 9, the shadow image X' formed when tilted X-rays are radiated is shown in the right of the shadow image X formed when the X-ray radiation angle is 90 degrees. As described above, on the basis that even if the same shadow image X' were formed on the sensor panel 22, shadow images are formed at different positions according to the direction of X-ray source, the operation unit may calculate the X-ray radiation angle more accurately.

The X-ray detector according to the embodiment including a subject incorporated therein may calculate X-ray radiation angle based on the shadow image of the subject formed on the sensor panel and the shadow information stored in the memory. Therefore, in the X-ray detector according to the embodiment, even if tilted X-rays are radiated, the X-ray radiation angle can be measured by the X-ray detector itself using the subject incorporated in the X-ray detector, and image correction may be performed based on the measured X-ray radiation angle.

Figure 10:
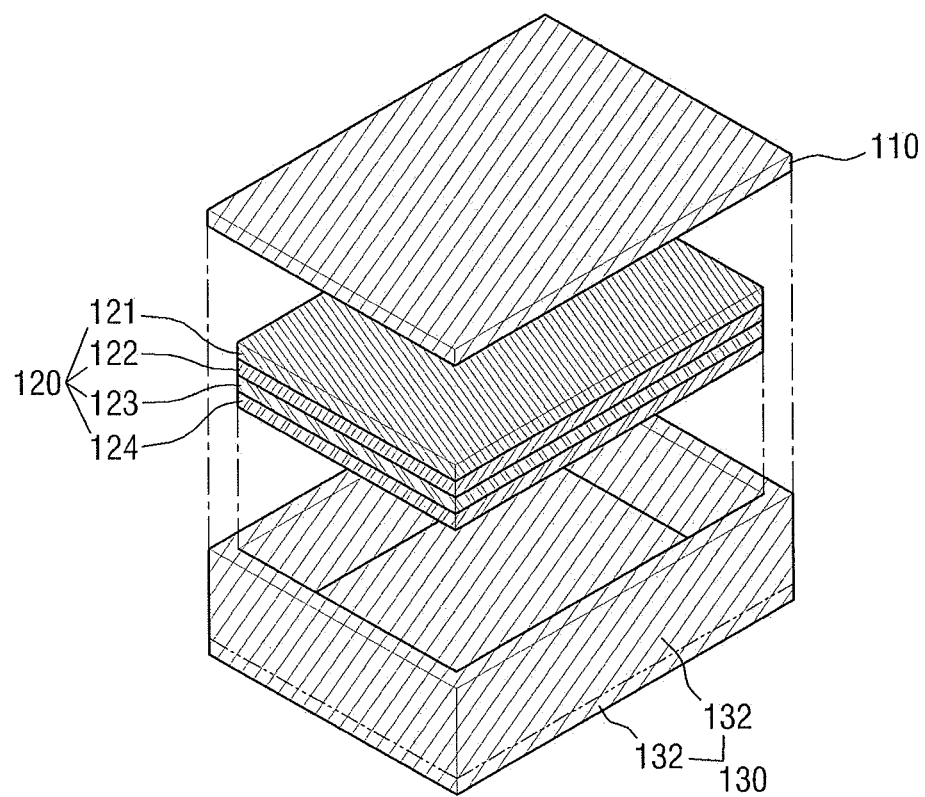
FIG. 10 is an exploded perspective view of an X-ray detector according to another embodiment.

FIG. 10 is an exploded perspective view of an X-ray detector according to another embodiment.

Referring to FIG. 10, the X-ray detector 200 according to another embodiment includes a top receiving container 110, an X-ray detection unit 120 and a bottom receiving container 130.

The top receiving container 110 is disposed on the bottom receiving container 130 and the X-ray detection unit 120, thereby protecting the X-ray detection unit 120 accommodated in the bottom receiving container 130. The top receiving container 110 may be formed of a carbon panel.

The bottom receiving container 130 may include a bottom plate 131 and a sidewall 132. In the bottom receiving container 130, the bottom plate 131 and the sidewall 132 may define a receiving space to accommodate the X-ray detection unit 120 therein. The bottom receiving container 130 may be made of the same materials as the top receiving container 110. In addition, in some embodiments, the bottom plate 131 of the bottom receiving container 130 may be made of the same materials as the top receiving container 110 and the sidewall 132 of the bottom receiving container 130 may be made of a material through which X-rays are not transmitted well, such as lead or tungsten.

The X-ray detection unit 120 may be accommodated in the receiving space of the bottom receiving container 130 and may detect a shadow image of the sidewall 132 and calculate the X-ray radiation angle of radiated X-rays based on the shadow image of the sidewall 132. The memory may store shadow information of the sidewall 132 based on a predetermined X-ray radiation angle. The operation unit may calculate the X-ray radiation angle based on the shadow image of the sidewall 132 formed on the sensor panel 122 and the shadow information stored in the memory. The X-ray detection unit 120 and a scintillator 121, a sensor panel 122, the memory and the operation unit included in the X-ray detection unit 120 may be substantially the same as those shown in FIGS. 1 to 9. Accordingly, explanations thereof will not be repeated. A method of calculating an X-ray radiation angle of the X-ray detector 120 will be described in detail below.

Figure 11:
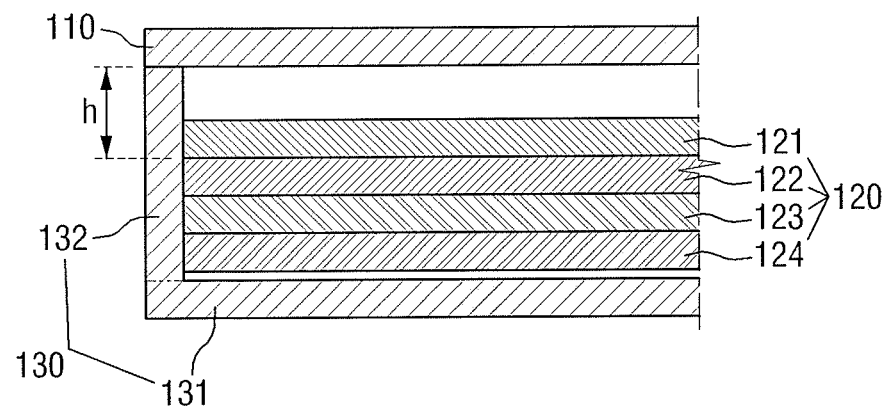
FIGS. 11 to 13 are cross-sectional views of X-ray detectors according to various embodiments.
Figure 12:
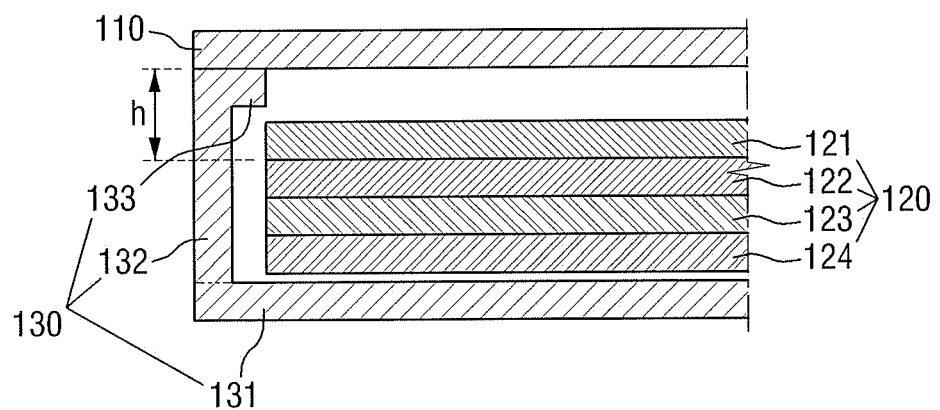
Figure 13:
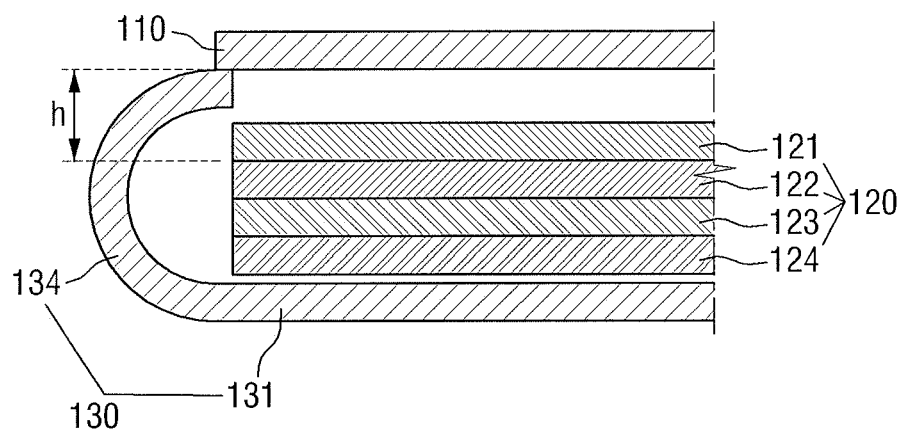
Figure 14:
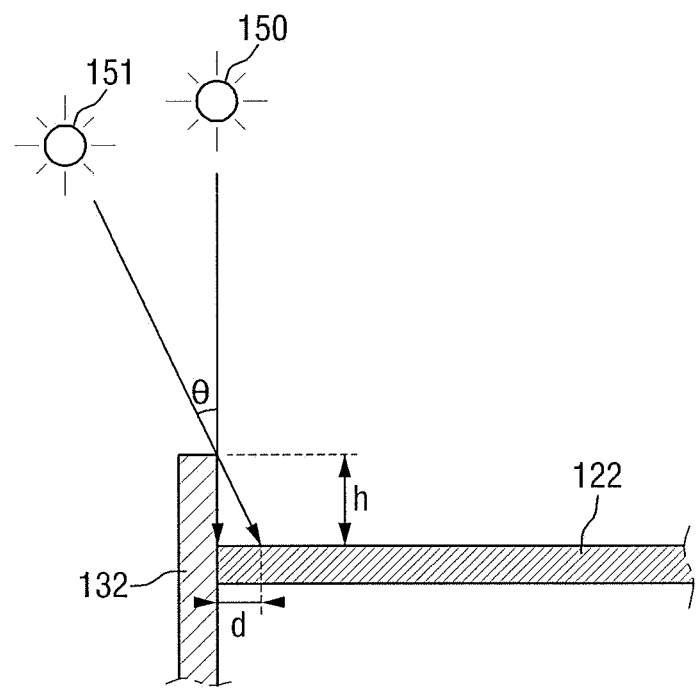
FIGS. 14 and 15 are conceptual diagrams for explaining a method of calculating an X-ray radiation angle in the X-ray detector shown in FIG. 10.
Figure 15:
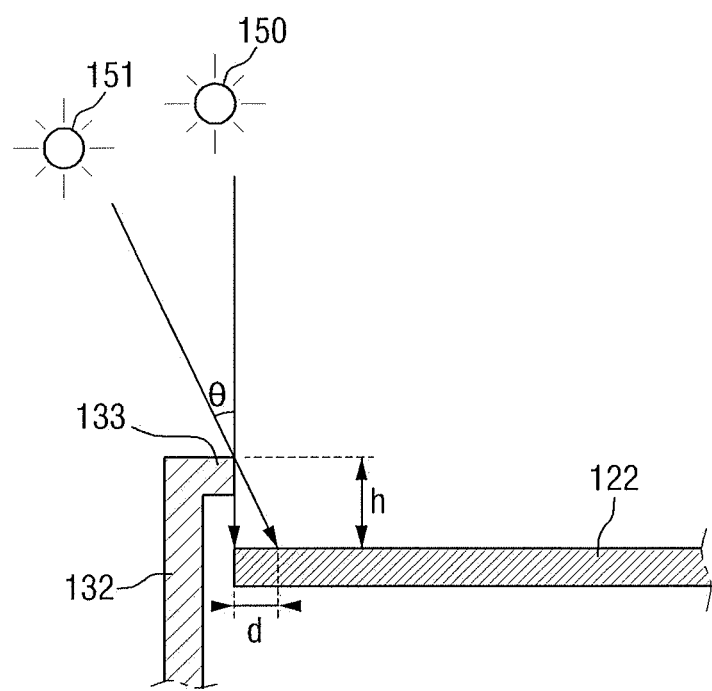

FIGS. 11 to 13 are cross-sectional views of X-ray detectors according to various embodiments and FIGS. 14 and 15 are conceptual diagrams for explaining a method of calculating an X-ray radiation angle in the X-ray detector shown in FIG. 10.

Referring to FIG. 11, the sidewall 132 of the bottom receiving container 130 may be made of a material through which X-rays are not transmitted well. The sidewall 132 of the bottom receiving container 130 and the X-ray detection unit 120 may not be spaced apart from each other but may contact each other. In this case, a height of the sidewall 132 may correspond to a vertical distance between the highest part of the sidewall 132, from the bottom plate 131, and a top surface of the sensor panel 122. With this configuration, the X-ray radiation angle of radiated X-rays can be calculated based on the shadow image of the sidewall 132 formed on the sensor panel 122. The detailed method of calculating the X-ray radiation angle will be described below with reference to FIG. 14.

Referring to FIG. 14, the memory may store shadow information of the sidewall 132 depending on a predetermined X-ray radiation angle. The operation unit may calculate the X-ray radiation angle of the radiated X-rays based on the shadow image of the sidewall 132 formed on the sensor panel 122 and the shadow information stored in the memory.

In some embodiments, the operation unit may detect the shadow information corresponding to the shadow image of the sidewall 132 formed on the sensor panel 122 from the memory and may determine the X-ray radiation angle of the radiated X-rays based on the detected shadow information. The shadow information stored in the memory may include the shadow image of the sidewall 132 depending on the predetermined X-ray radiation angle.

Referring to FIG. 14, when the predetermined X-ray radiation angle is 90 degrees, that is, when X-rays are radiated from an X-ray source 150, a shadow image of the sidewall 132 may not be formed on the sensor panel 122. However, when X-rays are tilted with a radiation angle of θ, that is, the X-rays are radiated from an X-ray source 151, a shadow image of the sidewall 132 may be formed on the sensor panel 122.

The memory may pre-store the shadow image of the sidewall 132 depending on the predetermined X-ray radiation angle. In some embodiments, the memory may pre-store a length 'd' of the shadow image of the sidewall 132 depending on the predetermined X-ray radiation angle. Therefore, the operation unit may detect the shadow information corresponding to the length 'd' of the shadow image X of the sidewall 132 formed on the sensor panel 122 and may determine the X-ray radiation angle of the radiated X-rays based on the detected shadow information. When the length of the shadow image X of the sidewall 132 formed on the sensor panel 122 is d, the operation unit may detect the shadow information stored in the memory in which the length 'd' of the shadow image is stored, and when the corresponding shadow information stored in the memory indicates a radiation angle of θ, the operation unit may determine the X-ray radiation angle of the radiated X-rays to be θ.

Referring to FIG. 14, the operation unit may calculate the X-ray radiation angle of the radiated X-rays based on the height of the sidewall 132 and the shadow image of the sidewall formed on the sensor panel 122. In some embodiments, the operation unit may calculate the X-ray radiation angle based on a height h of the sidewall 132 formed on the sensor panel 122 and a length 'd' of the shadow image of the sidewall 132 formed on the sensor panel 122. For example, the operation unit may employ a trigonometric function. Referring to FIG. 14, the operation unit may calculate the X-ray radiation angle θ using a trigonometric function in which the height 'h' of the sidewall 132 represents one side of a triangle, the length 'd' of the shadow image of the sidewall 132 represents another side of the triangle, and the one side and the another side of the triangle are at a right angle. Specifically, the operation unit may calculate the X-ray radiation angle θ using a formula $\tan \theta = d/h$.

Next, referring back to FIG. 12, in another implementation, the bottom receiving container 130 may include a protrusion protruding from the sidewall 132. The sidewall 132 and the protrusion 133 may be made of a material through which X-rays are not transmitted well. The sidewall 132 of the bottom receiving container 130 and the X-ray detection unit 120 may be spaced apart from each other. In this case, a distance between the sidewall 132 of the bottom receiving container 130 and the X-ray detection unit 120 may be equal to a height of the protrusion 133, but other distances are possible. In addition, the height of the sidewall 132 may correspond to a vertical distance between the highest part of the sidewall 132, from the bottom plate 131, and a top surface of the sensor panel 122. With this configuration, the X-ray radiation angle of the radiated X-rays can be calculated based on the shadow images of the sidewall 132 formed on the sensor panel 122 and the protrusion 133. The detailed method of calculating the X-ray radiation angle will be described below with reference to FIG. 15.

Referring to FIG. 15, the memory may store shadow information of the sidewall 132 and/or the protrusion 133 depending on a predetermined X-ray radiation angle. The operation unit may calculate the X-ray radiation angle of the radiated X-rays based on the shadow images of the sidewall 132 and/or the protrusion 133 and the shadow information stored in the memory.

In some embodiments, the operation unit may detect the shadow information corresponding to the shadow images of the sidewall 132 formed on the sensor panel 122 and/or the protrusion 133 from the memory and may determine the X-ray radiation angle of the radiated X-rays based on the detected shadow information. The shadow information stored in the memory may include the shadow images of the sidewall 132 formed on the sensor panel 122 and/or the protrusion 133.

Referring to FIG. 15, when the X-ray radiation angle is 90 degrees, that is, when X-rays are radiated from an X-ray source 150, shadow images of the sidewall 132 and/or the protrusion 133 may not be formed on the sensor panel 122. However, when X-rays are tilted with a radiation angle of θ, that is, the X-rays are radiated from an X-ray source 151, shadow images of the sidewall 132 and/or the protrusion 133 may be formed on the sensor panel 122.

The memory may pre-store the shadow images of the sidewall 132 and/or the protrusion 133 depending on a predetermined X-ray radiation angle. In some embodiments, the memory may pre-store the length 'd' of each of the shadow images of the sidewall 132 and/or the protrusion 133 depending on the predetermined X-ray radiation angle. Therefore, the operation unit may detect the shadow information corresponding to the length 'd' of each of the shadow images of the sidewall 132 formed on the sensor panel 122 and/or the protrusion 133 from the memory and may determine the X-ray radiation angle of the radiated X-rays based on the detected shadow information. That is to say, when a length of a shadow image formed on the sensor panel 122 is d, the operation unit may detect the shadow information stored in the memory in which the length 'd' of the shadow image is stored, and when the corresponding shadow information stored in the memory indicates a radiation angle of θ, the operation unit may determine the X-ray radiation angle of the radiated X-rays as to be θ.

Referring to FIG. 15, the operation unit may calculate the X-ray radiation angle based on the shadow images of the sidewall 132 formed on the sensor panel 122 and/or the protrusion 133. In some embodiments, the operation unit may calculate the X-ray radiation angle of the radiated X-rays based on a height 'h' of the sidewall 132 formed on the sensor panel 122 and a length 'd' of the shadow image of the sidewall 132 formed on the sensor panel 122 and/or the protrusion 133. For example, the operation unit may employ a trigonometric function. Referring to FIG. 14, the operation unit may calculate the X-ray radiation angle θ using a trigonometric function in which the height 'h' of the sidewall 132 represents one side of a triangle, the length 'd' of the shadow image of the sidewall 132 represents another side of the triangle, and the one side and the another side of the triangle are at a right angle. Specifically, the operation unit may calculate the X-ray radiation angle θ using a formula tan θ=d/h.

Referring to FIG. 13, a sidewall 134 of the bottom receiving container 130 may be made of a material through which X-rays are not transmitted well and may be "C" shaped. The sidewall 134 of the bottom receiving container 130 and the X-ray detection unit 120 may not be spaced apart from each other. In this case, a cutting line of a top end of the C-shaped sidewall 134 may be positioned on the same line as an extension line of one end of the X-ray detection unit 120, but other configurations are possible. In addition, a height of the sidewall 134 may correspond to a vertical distance between the highest part of the sidewall 134, from the bottom plate 131, and a top surface of the sensor panel 122. With this configuration, the X-ray radiation angle of the radiated X-rays can be calculated based on a shadow image of the sidewall 134 formed on the sensor panel 122. The detailed method of calculating the X-ray radiation angle may be substantially the same as those shown in FIGS. 14 and 15. Accordingly, descriptions thereof will not be repeated.

In the X-ray detector according to at least one embodiment, a structure for measuring an X-ray radiation angle does not need to be provided separately from the X-ray detector. Instead, a structure incorporated into the X-ray detector is used to calculate the X-ray radiation angle. Therefore, in the X-ray detector according to the embodiment, even if tilted X-rays are radiated, the X-ray radiation angle can be measured by the X-ray detector itself by using a subject such as sidewalls incorporated in the X-ray detector, and image correction may be performed based on the measured X-ray radiation angle.

Figure 16:
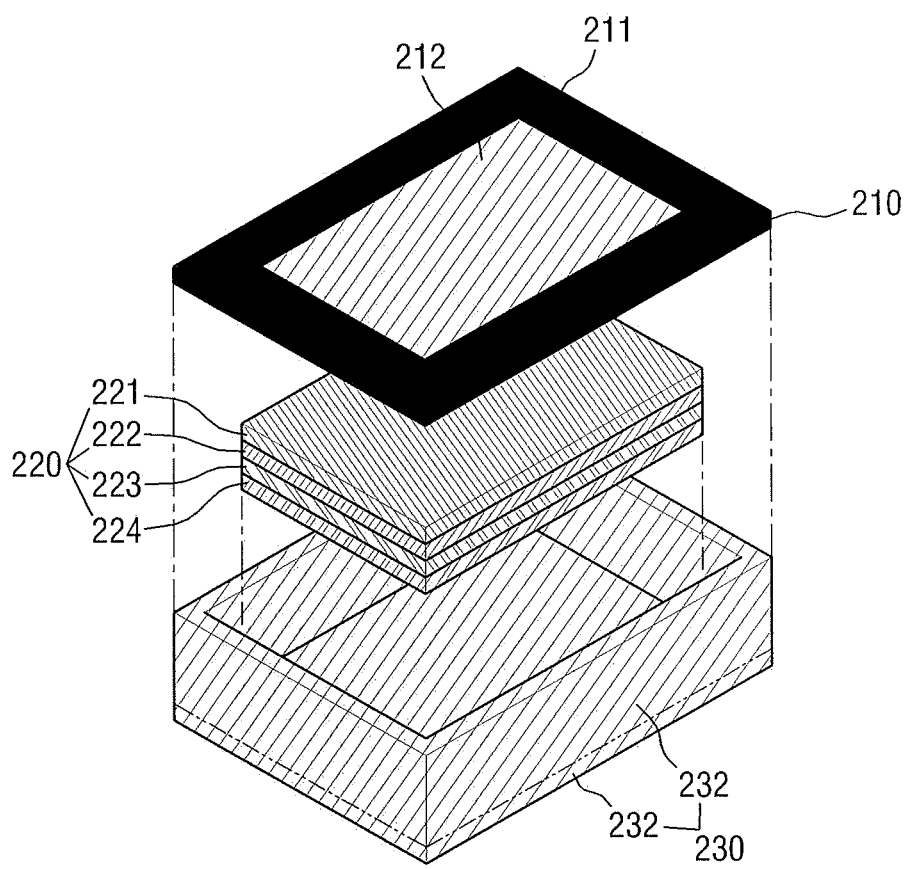
FIG. 16 is an exploded perspective view of an X-ray detector according to still another embodiment.
Figure 17:
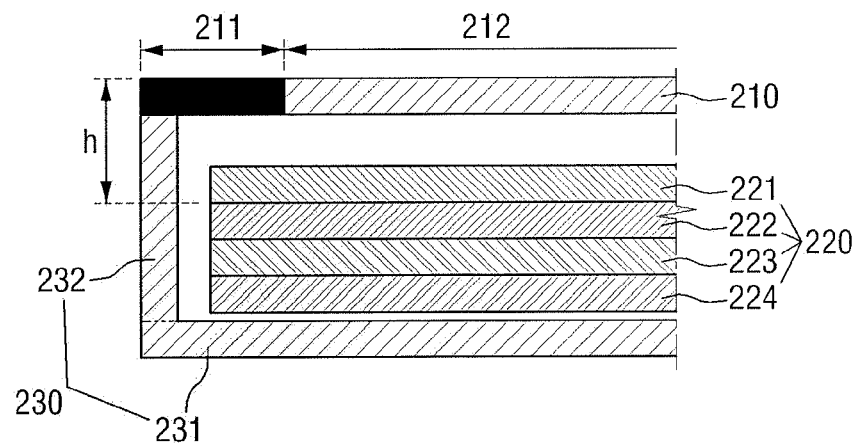
FIG. 17 is a cross-sectional view of the X-ray detector shown in FIG. 16.

FIG. 16 is an exploded perspective view of an X-ray detector according to still another embodiment and FIG. 17 is a cross-sectional view of the X-ray detector shown in FIG. 16.

Figure 18:
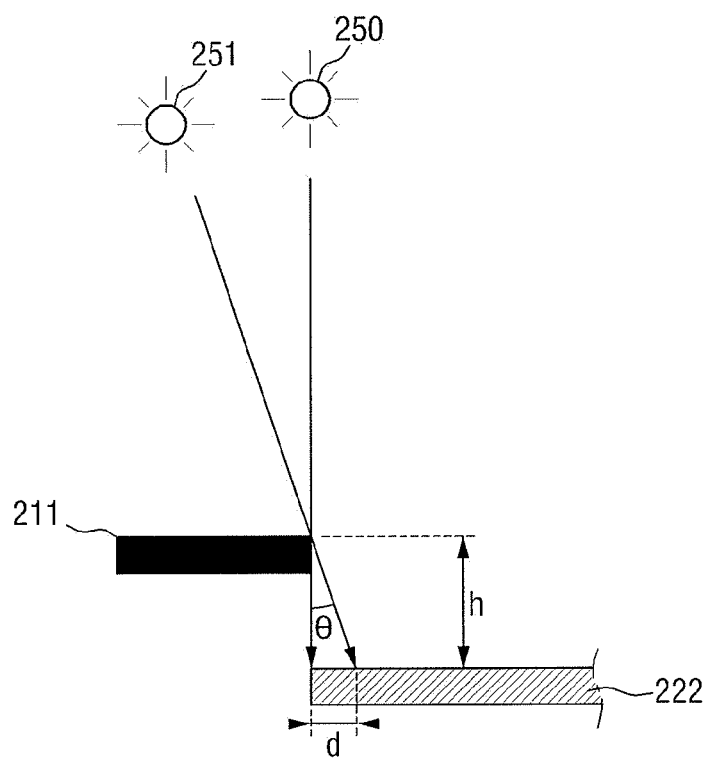
FIG. 18 is a conceptual diagram for explaining a method of calculating an X-ray radiation angle in the X-ray detector shown in FIG. 16.

Referring to FIGS. 16 and 18, the X-ray detector 300 includes a top receiving container 210, an X-ray detection unit 220 and a bottom receiving container 230.

The bottom receiving container 230 may include a bottom plate 231 and a sidewall 232. In the bottom receiving container 230, the bottom plate 231 and the sidewall 232 may define a receiving space to accommodate the X-ray detection unit 220 therein. The bottom receiving container 230 may be substantially the same as the bottom receiving containers shown in FIGS. 10 to 15. Accordingly, explanations thereof will not be repeated.

The top receiving container 210 may be disposed on the bottom receiving container 230 and the X-ray detection unit 220, thereby protecting the X-ray detection unit 220 accommodated in the bottom receiving container 230.

The top receiving container 210 may have a first region 212 and a second region 211. In some embodiments, the second region 211 may surround the first region 212. The first region 212 may be positioned at a central portion of the top receiving container 210, and the second region 211 may be positioned at a peripheral portion of the top receiving container 210. The first region 212 may be a region into which X-rays are actually incident and from which an image of a photographed object is detected. The second region 211 may be a bezel region from which an actual image is not detected.

Referring to FIG. 17, the X-ray detection unit 220 may be spaced apart from the sidewall 232, and a boundary between the first region 212 and the second region 211 may be positioned on the same line as an extension line of one end of the X-ray detection unit 220, but in other implementations, other configurations may be provided.

The first region 212 and the second region 211 may be made of different materials. For example, the first region 212 may be formed of a carbon panel. The second region 211 may be made of a material through which X-rays are not transmitted well, for example, lead or tungsten.

The X-ray detection unit 220 may be accommodated in the receiving space. The X-ray detection unit 220 detects a shadow image of the second region 211 of the top receiving container 210 when X-rays are radiated, and calculates the X-ray radiation angle of the radiated X-rays based on the shadow image of the second region 211 of the top receiving container 210. The memory may store shadow information of the second region 211. The operation unit may calculate the X-ray radiation angle of the radiated X-rays based on a shadow image of the second region 211 formed on the sensor panel 222 and the shadow information stored in the memory. The X-ray detection unit 220 and a scintillator 221, a sensor panel 222, the memory and the operation unit included in the X-ray detection unit 220 are substantially the same as those shown in FIGS. 1 to 15. Accordingly, explanations thereof will not be repeated. A method of calculating an X-ray radiation angle using the X-ray detector 220 will be described below in detail with reference to FIG. 18.

FIG. 18 is a conceptual diagram for explaining a method of calculating an X-ray radiation angle in the X-ray detector shown in FIG. 16.

Referring to FIG. 18, the memory may store shadow information of the second region 211 depending on a predetermined X-ray radiation angle. The operation unit may calculate the X-ray radiation angle of the radiated X-rays based on the shadow image of the second region 211 formed on the sensor panel 222 and the shadow information stored in the memory.

In some embodiments, the operation unit may detect the shadow information corresponding to the shadow image of the second region 211 of the top receiving container 210 formed on the sensor panel 222 from the memory and may determine the X-ray radiation angle of the radiated X-rays based on the shadow information. The shadow information stored in the memory may be the shadow image of the second region 211 depending on the predetermined X-ray radiation angle.

Referring to FIG. 18, when the X-ray radiation angle is 90 degrees, that is, when X-rays are radiated from an X-ray source 250, the shadow image of the second region 211 of the top receiving container 210 may not be formed on the sensor panel 222. However, when the X-ray radiation angle is θ, that is, when X-rays are radiated from an X-ray source 251, the shadow image of the second region 211 of the top receiving container 210 may be formed on the sensor panel 222.

The memory may pre-store the shadow image of the second region 211 depending on the predetermined X-ray radiation angle. In some embodiments, the memory may pre-store a length 'd' of the shadow image of second region 211 formed on the sensor panel 222 depending on the predetermined X-ray radiation angle. Therefore, the operation unit may detect the shadow information corresponding to the length 'd' of the shadow image of the second region 211 formed on the sensor panel 222 from the memory and may determine the X-ray radiation angle of the radiated X-rays based on the detected shadow information. That is to say, when a length of a shadow image formed on the sensor panel 222 is d, the operation unit may detect the shadow information stored in the memory in which the length 'd' of the shadow image is stored, and when the corresponding shadow information stored in the memory indicates a radiation angle of θ, the operation unit may determine the X-ray radiation angle of the radiated X-rays to be θ.

Referring to FIG. 18, the operation unit may calculate the X-ray radiation angle of the radiated X-rays based on a height of the sidewall 132 and the shadow image of the second region 211 formed on the sensor panel 222. In some embodiments, the operation unit may calculate the X-ray radiation angle of the radiated X-rays based on a height 'h' of the sidewall 232 and a length 'd' of a shadow image of the second region 211 formed on the sensor panel 222 from the sidewall 232. For example, the operation unit may employ a trigonometric function. Referring to FIG. 18, the operation unit may calculate the X-ray radiation angle θ using a trigonometric function in which the height 'h' of the sidewall 232 represents one side of a triangle, the length 'd' of the shadow image of the sidewall 232 represents another side of the triangle, and the one side and the another side of the triangle are at a right angle. Specifically, the operation unit may calculate the X-ray radiation angle θ of the radiated X-rays using a formula $\tan \theta = d/h$.

In the X-ray detector according to at least one embodiment, a structure for measuring an X-ray radiation angle does not need to be provided separately in the X-ray detector. Instead, a structure incorporated into the X-ray detector may be used to calculate the X-ray radiation angle. Therefore, in the X-ray detector according to the embodiment, even if tilted X-rays are radiated, the X-ray radiation angle can be measured by the X-ray detector itself without using a separate device, and image correction may be performed based on the measured X-ray radiation angle.

By way of summation and review, an X-ray detector is an apparatus that detects an amount of X-rays radiated to an object and transmitted through the object based on a difference in the energy intensity distribution of transmitted X-rays, thereby identifying the internal structure or state of the object.

When X-rays radiated from an X-ray generator or an X-ray source are transmitted through an object to then reach the X-ray detector, the X-ray detector may identify the internal structure or state of the object based on the X-rays. An angle of the X-ray radiated to the X-ray detector may be an important factor in determining the internal structure or state of the object.

In order to measure the X-ray radiation angle, a separate measuring device may be attached to the X-ray detector. However, the X-ray radiation angle measuring method using a separate measuring device is typically employed in an environment such a research laboratory, and it may be difficult to employ such a separate measuring device in less specialized environment such as a hospital or airport.

In addition, a cassette type X-ray detector may be freely handled. Accordingly, there may be an increased probability that X-rays radiated from an X-ray generator may be incident on the detector at a tilted angle, thereby raising a possibility that an image may be distorted.

The embodiments may provide an X-ray detector that can autonomously measure an X-ray radiation angle using a subject incorporated into the X-ray detector, even if tilted X-rays are radiated to the X-ray detector.

The embodiments may also provide an X-ray detector that can measure an X-ray radiation angle using a structure of the X-ray detector itself.

The embodiments may also provide an X-ray detector that can compensate for and/or correct image distortion due to tilted X-ray radiation by measuring an X-ray radiation angle directly from the X-ray detector.

While embodiments have been particularly shown and described with reference to exemplary embodiments thereof, it will be understood by those of ordinary skill in the art that various changes in form and details may be made therein without departing from the spirit and scope as defined by the following claims. It is therefore desired that the present embodiments be considered in all respects as illustrative and not restrictive, reference being made to the appended claims rather than the foregoing description to indicate the scope of the invention.

What is claimed is:

1. An X-ray detector, comprising:
   a top receiving container in which one or more subjects are disposed;
   an X-ray detection unit that detects shadow images of the one or more subjects when X-rays are radiated to the one or more subjects, and calculates an X-ray radiation angle of the radiated X-rays based on the shadow images of the one or more subjects; and
   a bottom receiving container having a receiving space in which the X-ray detection unit is received.

2. The X-ray detector as claimed in claim 1, wherein the top receiving container includes a first cover, the first cover having a first region and a second region, and the second region surrounding the first region.

3. The X-ray detector as claimed in claim 2, wherein:
   a surface of the first region of the first cover includes one or more grooves,
   and the one or more subjects are disposed in the grooves.

4. The X-ray detector as claimed in claim 2, wherein the one or more subjects are disposed in the first region.

5. The X-ray detector as claimed in claim 2, wherein the one or more subjects are disposed adjacent to a boundary between the first region and the second region.

6. The X-ray detector as claimed in claim 2, wherein:
   the top receiving container further includes a second cover positioned on the first cover, and
   the one or more subjects are disposed in the second cover.

7. The X-ray detector as claimed in claim 1, wherein the X-ray detection unit includes:
   a scintillator that converts incident X-rays into light;
   a sensor panel that senses an intensity of the light from the scintillator;
   a memory that stores shadow information of the one or more subjects based on a predetermined X-ray radiation angle between the X-rays and a normal to the sensor panel; and
   an operation unit that calculates the X-ray radiation angle of the radiated X-rays based on the shadow images of the one or more subjects formed on the sensor panel and the shadow information stored in the memory.

8. The X-ray detector as claimed in claim 7, wherein the operation unit detects the shadow information corresponding, to the shadow images of the one or more subjects formed on the sensor panel from the memory and calculates the X-ray radiation angle of the radiated X-rays based on the detected shadow information.

9. The X-ray detector as claimed in claim 1, wherein the X-ray detection unit includes:
   a memory that stores shadow information of the one or more subjects when a predetermined X-ray radiation angle is 90 degrees, and
   an operation unit that calculates the X-ray radiation angle of the radiated X-rays based on the shadow information of the one or more subjects when the predetermined X-ray radiation angle is 90 degrees and based on the shadow images of the one or more subjects formed on a sensor panel.

10. The X-ray detector as claimed in claim 9, wherein:
    the memory stores vertical distances between the one or more subjects and the sensor panel, and
    the operation unit calculates the X-ray radiation angle of the radiated X-rays based on the vertical distances, the shadow information of the one or more subjects when the predetermined X-ray radiation angle is 90 degrees, and the shadow images of the one or more subjects formed on the sensor panel.

11. The X-ray detector as claimed in claim 10, wherein:
    the operation unit calculates the X-ray radiation angle of the radiated X-rays using a trigonometric function in which the vertical distances and a position difference between the shadow information of the one or more subjects when the predetermined X-ray radiation angle is 90 degrees and the shadow images of the one or more subjects formed on the sensor panel are used as sides of a triangle.

12. The X-ray detector as claimed in claim 11, wherein the shadow information includes subject shadow images depending on the predetermined X-ray radiation angle.

13. The X-ray detector as claimed in claim 1, wherein the one or more subjects are made of lead or tungsten.

14. An X-ray detector, comprising:
    a bottom receiving container having a bottom plate and a sidewall defining a receiving space;
    an X-ray detection unit that is accommodated in the receiving space, the X-ray detecting unit detecting a shadow image of the sidewall when X-rays are radiated to the X-ray detector and calculating an X-ray radiation angle of the radiated X-rays based on the shadow image of the sidewall; and
    a top receiving container disposed on the sidewall.

15. The X-ray detector as claimed in claim 14, wherein the X-ray detection unit includes:
    a scintillator that converts incident X-rays into light;
    a sensor panel that senses the intensity of the light from the scintillator;
    a memory that stores shadow information of the sidewall based on a predetermined X-ray radiation angle; and
    an operation unit that calculates the X-ray radiation angle of the radiated X-rays based on the shadow image of the sidewall formed on the sensor panel and the shadow information stored in the memory.

16. The X-ray detector as claimed in claim 15, wherein the bottom receiving container includes a protrusion protruding from the sidewall.

17. The X-ray detector as claimed in claim 15, wherein the sidewall is "C" shaped.

18. The X-ray detector as claimed in claim 15, wherein the shadow information includes a shadow image of the sidewall depending on the predetermined X-ray radiation angle.

19. The X-ray detector as claimed in claim 14, wherein the X-ray detection unit includes:
    a memory that stores a height of the sidewall from a sensor panel, and
    an operation unit that calculates the X-ray radiation angle of the radiated X-rays based on the height of the sidewall and the shadow image of the sidewall formed on the sensor panel.

20. The X-ray detector as claimed in claim 19, wherein the operation unit calculates the X-ray radiation angle of the radiated X-rays using a trigonometric function in which the height of the sidewall and a length of the shadow of the sidewall are used as sides of a triangle.

21. An X-ray detector, comprising:
    a bottom receiving container having a bottom plate and a sidewall defining a receiving space;
    a top receiving container disposed on the sidewall and having a first region and a second region;
    an X-ray detection unit that is accommodated in the receiving space, the X-ray detection unit detecting a shadow image of the second region when X-rays are radiated to the X-ray detector, and calculating an X-ray radiation angle of the radiated X-rays based on the shadow image of the second region.

22. The X-ray detector as claimed in claim 21, wherein:
the second region surrounds the first region, and
the second region is made of lead or tungsten.

23. The X-ray detector as claimed in claim 21, wherein the X-ray detection unit includes:
- a scintillator that converts incident X-rays into light;
- a sensor panel that senses an intensity of the light from the scintillator;
- a memory that stores shadow information of the second region based on a predetermined X-ray radiation angle; and
- an operation unit that calculates the X-ray radiation angle of the radiated X-rays based on the shadow image of the second region formed on the sensor panel and based on the shadow information stored in the memory.

24. The X-ray detector as claimed in claim 21, wherein the X-ray detection unit includes:
- a memory that stores a height of the sidewall from a sensor panel to the sidewall, and
- an operation unit that calculates the X-ray radiation angle of the radiated X-rays based on the height of the sidewall and the shadow image of the second region formed on the sensor panel.

\* \* \* \* \*